Patented Feb. 18, 1941

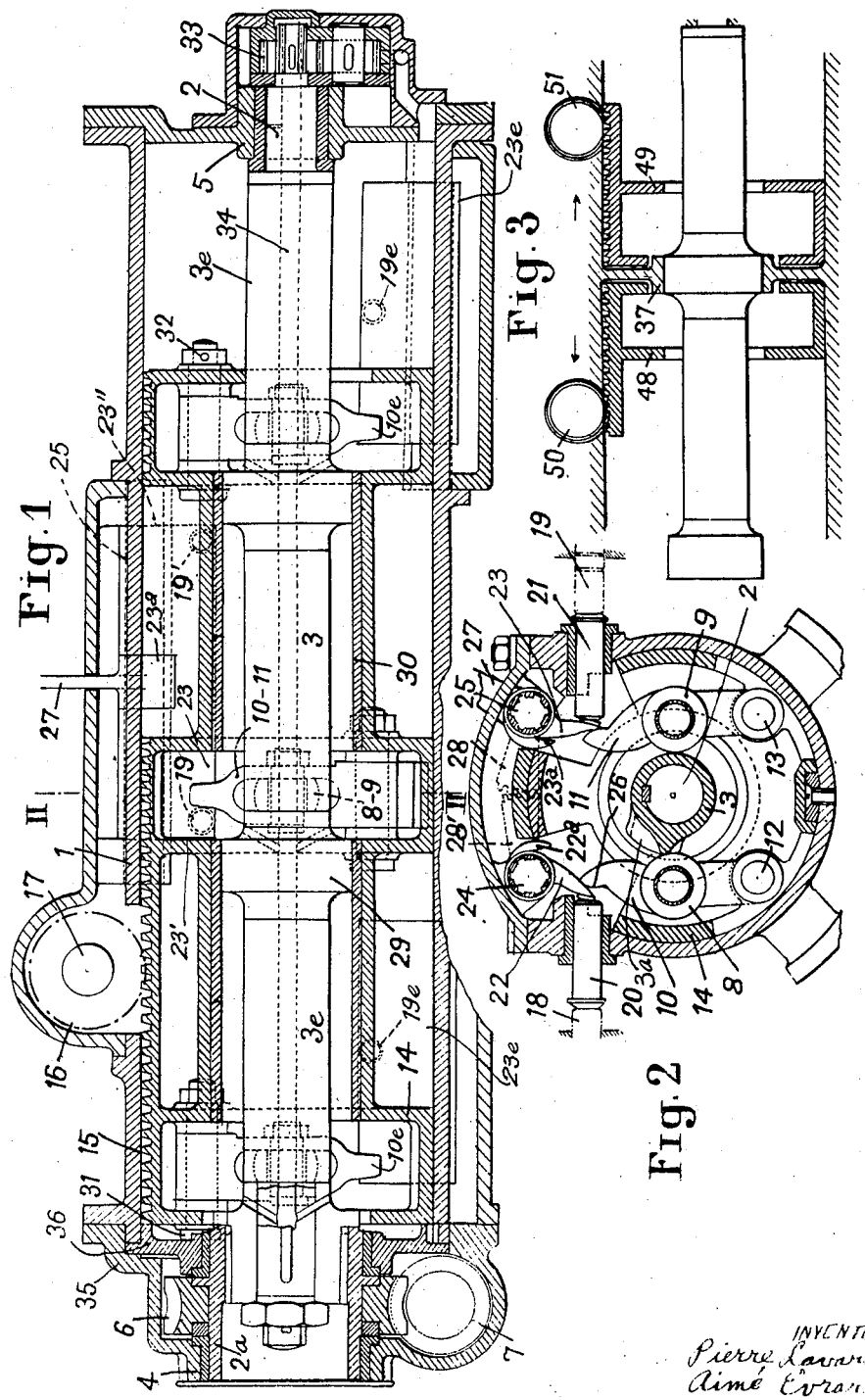

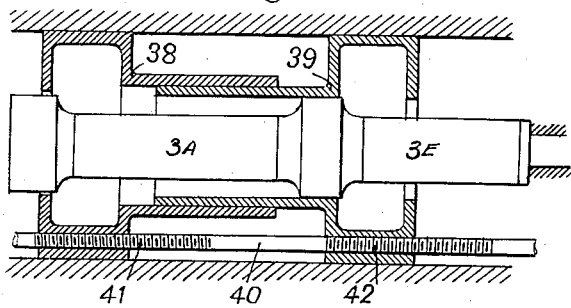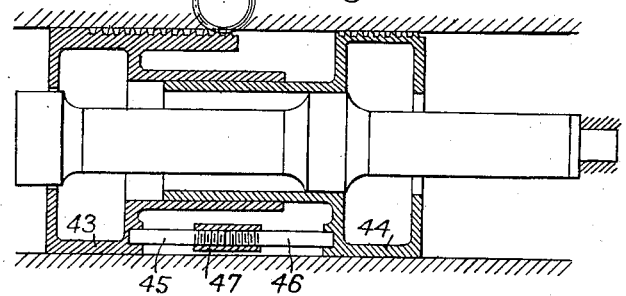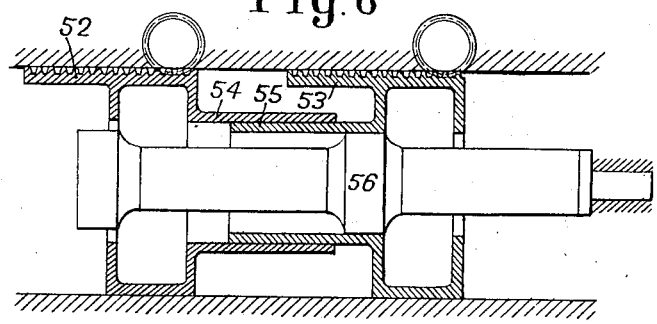

2,232,330

UNITED STATES PATENT OFFICE 2,232,330

VALVE GEAR FOR STEAM ENGINES

Pierre Lavarde and Aimé Evrard, Paris, France, assignors to the firm Societe D'Exploitation Des Procedes Dabeg, Paris, France Application November 11, 1937, Serial No. 174,001
In France September 10, 1937

15 Claims. (Cl. 121—127)

This invention relates to valve gears for steam engines and especially to valve gear devices employing rotating cams, and more particularly to valve gears for steam locomotives.

In valve gears provided with a rotating cam, which are used for steam locomotives and the like, the reversing motion is generally obtained by means of a suitable displacement of the cam, while the parts designed for transmitting to the valve stems the movement derived from the cam have to undergo only a simple rocking or swiveling movement in the plane of the associated valve stem. Such adjustable displacement of a cam which must also perform its rotating movement requires, in many cases, more or less complicated arrangements which involve correspondingly important and numerous drawbacks. For instance, when one or more continuous cams or step cams are to be displaced along their rotational axis, there must needs be a noticeable increase in the length of the cam case in order to permit of such displacements.

It is an object of the present invention to provide a valve gear or controlling device which remedies the above drawbacks; the invention being more particularly characterized by the feature that the members (such as levers or the like) which transmit the motion for opening or for closing the distribution valves are located on supports which are so arranged as to be displaceable along the rotating cam or cams, which cams are mounted for rotation but not for longitudinal displacement, with the purpose of providing for the valves of an engine cylinder a control unit of simple and economical construction requiring less space than constructions heretofore used, and being mounted in a single casing. Other objects and advantages will be evident from the drawings and the description of the mechanism shown therein.

The accompanying drawings show, by way of example, a preferred embodiment of the invention in a valve gear employing continuous cams and adapted to be mounted on a steam locomotive. In said drawings:

Figure 1 is a longitudinal section of the cam case, showing the cams therein, together with associated parts, adapted to be applied to a locomotive cylinder having at each end two admission valves and two exhaust valves, said cylinder and valves being not shown in the drawings, in order not to encumber the same;

Figure 2 is an irregular cross-section taken approximately on the line 2—2 of Figure 1; and Figures 3, 4, 5 and 6 are fragmentary views similar to Figure 1, but on a reduced scale, diagrammatically showing certain modifications of the device of Figure 1.

Referring now to Figures 1 and 2, the cam case 1, cylindrical in shape and conveniently mounted on or connected with a steam cylinder (not shown in the drawings), contains the camshaft 2 which is so located and mounted as to be capable of rotation but not of axial sliding. Said shaft 2 is at one end journalled in a bearing 5, and at the other end has an enlarged extension 2a which is journalled in a bearing 4. The shaft 2 receives its rotary motion from any suitable means, which may be for instance, a helical wheel 6 meshing with the worm 7, which itself receives its movement from a driving wheel of the locomotive (not shown in the drawings) by means of any suitable transmission, various forms of which are known in the art and need not be illustrated herein.

Mounted on the camshaft 2, for rotation therewith, is a group of cams, a cam for controlling the admission valves being indicated at 3, and two cams for controlling the exhaust valves being indicated at 3e. Rolling on said cams are rollers 8, 9, the rollers contacting with the admission cam being located on levers 10, 11, which are mounted by pivots 12, 13, (Figure 2) on a common carrier 14 which is reciprocable, that is, which may slide longitudinally inside the cam case 1. Similarly, levers 10e (pivoted, however, at their upper ends, as at 31, 32,) are provided for association with the exhaust valve controlling cams 3e.

The several cams are provided with profiles suitably adapted for obtaining the desired events of the steam distribution, and may have either continuous profiles (continuous cams) or successive profiles (step cams). A typical cam lobe, varying progressively, lengthwise thereof, is shown on the admission cam 3, at 3a in Figure 2, but it will be understood that the present invention is not concerned with the type of cam or cam profile employed.

The shaft 2 and the cams 3 and 3e located upon the same, in addition to being supported by bearings 4 and 5, are provided with intermediate supports or journals 29 which are accommodated in an internal sleeve 30 provided in carrier 14.

The carrier 14 is provided with a longitudinal rack 15 meshing with a toothed wheel 16 located on a spindle 17 which may be operated by the locomotive engineer, either directly or by means of any suitable intermediate mechanism, with or without a servomotor. Such a mechanism is not shown in the drawings, since it does not constitute a part of this invention. Thus the carrier 14, with the levers 10, 11, 10e, and their rollers 8, 9, may be slid longitudinally as a unit. In other words, a common carrier means mounts these separate elements for adjustable movement in unison along said cam means.

Each of levers 10, 11 (Figure 2) operates a corresponding valve stem 18, 19, by means of tappets 20, 21, through the intermediation of idler levers 22, 23, respectively hanging on pins 24, 25. Said idler levers are of suitable shape (for example, elongated from 23' to 23''), to effect the operation of the associated valve stem, tappet, or equivalent movable member, whatever may be the longitudinal position of the carrier 14 and consequently of the actuating lever 10 (or 11) and thus of the roller 8 (or 9) on the cam 3. In the constructional form shown, each lever 10 or 11 is intended to operate two valve stems, Figure 1 indicating a pair of stems at 19 and 19' to be actuated by one of said levers. This is for use with valves in multiple (as above mentioned), the stems only of which are herein shown; but it will be understood that various arrangements of multiple valves are known in the art—one example of multiple exhaust valves being shown in United States Patent No. 1,935,363 issued to the assignee of the present invention. When used in a multiple valve installation, the levers 22, 23, must be of such length as to abut both valve stems (or more strictly speaking the tappets thereof) as well as being long enough to be actuated by the end of the associated lever 10 (or 11), whatever may be the position of the latter lever in the cam case; it being understood that as the roller 8 (or 9) slides along the cam, the end of the said lever 10 (or 11) slides along the idler lever 22 (or 23), the length of which is designed in accordance with the extent of sliding travel of the carrier 14. Since each of the exhaust valve stems 19e (shown in Figure 1) is operated by a separate cam 3e, cam follower lever 10e, and idler lever 23e, the exhaust idler levers 23e need be only long enough to accommodate the full sliding travel of the levers 10e, and they are thus shown slightly shorter than the corresponding admission idler lever 23.

As shown in Figure 2, each motion transmitting element or lever 10 or 11 is provided at that end which contacts the corresponding lever 22 or 23 with a profile 26 similar to that of a gear tooth in order to realize a rolling contact under the effect of rotation of the cam.

Idler levers 22, 23, may be mounted on their pins 24, 25, for instance by means of splines, as shown in Figure 2. Pins 24, 25, are journalled at their free ends in convenient parts of case 1.

In order to keep the distributing valves, particularly the admission valves, in an opened position, when the locomotive is operating with closed throttle, for instance when the locomotive is "drifting" down-grade, we provide fingers 22a and 23a, pivoted on a smooth part of the pins 24, 25, and engageable with the idler levers 22, 23. These fingers may be actuated by means of an operating lever 27 provided with a hand control (or a mechanical control of any convenient design with or without a servomotor) which allows the engineer to bring the corresponding valve or valves into a constantly opened position. Finger 23a is actuated by lever 27 and is connected with a toothed sector 28 (Figure 2) meshing with a similar sector 28' which is solid with finger 22a in order to effect control, by means of lever 27, of all the valves which are associated with stems 18, 19, so that the corresponding valves are kept in their opened position.

As shown in Figure 2, the carrier 14, though in substantially surrounding relation to the cam shaft, is not continuously cylindrical but is provided with convenient cut-out portions or recesses for allowing the carrier to slide longitudinally, with proper clearances relative to the parts 22, 23, 22a, 23a, 23e, etc.

The operation of the mechanism is as follows: during normal operation, shaft 2, which is rotated (as from an axle of the locomotive) through worm 7 and helical wheel 6, imparts to the several cams a movement of rotation, the speed of which corresponds to the speed of the locomotive, thus operating the admission and exhaust valves by the rollers and levers heretofore described.

For modifying the steam distribution or the condition of operation of the steam engine, the engineer acts upon shaft 17 thus causing, through wheel 16 and rack 15, a longitudinal sliding of carrier 14 inside the cam case 1, thereby bringing the rollers, such as 8, 9, of the several valve operating levers, into contact with different profiles of the associated controlling cams, to alter the timing of the valves. The cams and their controlling shaft thus need not be moved axially but can be permanently set at one position with relation to the length of the case 1.

When it is desired to operate without steam, as for instance when the locomotive descends along a slope or gradient, the engineer acts upon the lever 27 and thence upon the associated fingers and idler levers such as 22a, 23a, 22 and 23 to hold the valves open.

The lubricating of the whole unit may be secured by the splash method or, preferably, by an oil pump, for instance a geared pump 33 as shown in Figure 1, in which said pump is located on the end of shaft 2 and forces oil into a passage 34 of said shaft for the distribution of said oil to the particular places to be lubricated, as by means of convenient branch passages, such arrangement providing the possibility of avoiding any loss of oil. The lubricating pump may, of course, be of any kind and of any desired dimension.

The described arrangement permits easy and quick access to the several parts: it is in fact sufficient to dismount or remove the end-plate 35, 36, then to disconnect the driving means of toothed wheel 16 to allow the endwise removal of carrier 14 together with the parts which are connected with the same and with camshaft 2, the right-hand end of said shaft (as viewed in Figure 1) readily accommodating such removal by virtue of its splined connection with the driving gear of the oil pump.

The constructional form of the device which is hereinabove described may, of course, be modified in numerous ways, without departing from the spirit and scope of the present invention. For instance, the admission and exhaust valves actuated by the mechanism located in the cam case may be of any desired type, number and arrangement; the invention not being limited to use with pairs of valves at each end of the cylinder. Likewise, the valve stems shown can be considered as extending either horizontally or vertically. As hereinbefore mentioned, the cams may be either continuous or stepped, and may be in any desired number, according to the number and arrangement of the valves to be actuated.

Furthermore, the described arrangement for holding the valves open for "drifting" may operate upon any one or more, or all, of the admission and/or exhaust valves. It will also be obvious that the actuating levers for the valves, which are carried by the carrier 14, may be altered as to size, shape and disposition, and the rollers thereon may in some instances be eliminated if desired. The displacement of the carrier, instead of being effected by means of a rack, can, of course, be obtained by any other suitable means. Furthermore, the number of camshafts mounted in the case is also immaterial to the broad principles of the invention.

Reference will now be made to the several modifications of the invention, as illustrated in Figures 3 to 6.

As shown in Figure 3, the camshaft, instead of being supported intermediate its ends by supports located in the carrier, may be supported by independent bearings such as 37, fixed directly in the cam case.

By reference to Figure 4, it will be seen that the admission cam 3A may differ in length from the exhaust cam 3E, in which event it is desirable that the levers and other parts which transmit the control from the one cam to the admission valves should have a longitudinal travel different from the travel of the corresponding parts for the exhaust valves. To this end, we have provided, in the arrangement of Figure 4, single or separate carriers, 38, 39, to carry the respective controlling levers and the like for the corresponding groups of valves, said single carriers being capable of displacement in the longitudinal, i. e., axial, direction by means of a common screw threaded shaft 40, connected with the associated carriers by means of the respective threaded parts 41 and 42, which differ in pitch, thereby securing the desired differential movement, i. e., difference in total adjustment of the two carriers by the intermediation of a single control member such as the shaft or rod 40.

It will be seen from Figure 5 that the use of separate carriers for the admission and exhaust controlling levers permits the ready determination, by means of experimental trials or otherwise, of the optimum relation between the admission and exhaust events, by virtue of the relative adjustment between the respective positions of the two carriers. Such a result may be obtained for instance by providing each of the carriers, here numbered 43 and 44, with a stem 45 or 46, the ends of said stems being conveniently oppositely screw threaded into a corresponding nut 47, for the accurate regulation of the relative positions of the two carriers, either when assembling the same or during inspection.

Each separate or independent carrier may also be provided with an independent means of adjustment, whereby a complete independence of the admission and exhaust valve events may be secured. This is illustrated in Figure 6, and also in Figure 3. In Figure 3, the single carriers 48 and 49 are provided with separate toothed wheels 50 and 51 in mesh with their respective racks, and are thus completely independent from each other. In the form shown in Figure 6, the independent carriers 52 and 53 have a similar independent adjustment, but are structurally cooperative in that they have concentric or telescopic portions 54 and 55, which constitute an additional guiding means, each for the other, while at the same time they constitute a guiding means for the intermediate support 56 of the camshaft.

As to all forms of the invention, it should be understood that the longitudinal displacement or adjustability of the carriers, with their associated valve actuating connections, is not to be considered as excluding the possibility of simultaneously employing a longitudinal displacement of one or more of the cams if so desired. Neither is the invention limited, in its broad aspects, to locomotive engines, since although of especial advantage in and having a peculiar cooperative relation with such engines, the invention is also utilizable in controlling the distribution of motive fluid in engines of other kinds.

What we claim is:

1. In steam-engine valve gear, actuating cam means movable about an axis and having differently arranged profiles at different points along said axis, a movable member through which a valve of the engine is adapted to be moved, a motion transmitting element interposed between the cam means and said member and adapted to operate the later from the former, and a reciprocable carrier mounting said element for adjustable movement axially along said cam means, said carrier being in substantially surrounding relation to and providing also a bearing for supporting the camshaft.

2. In steam-engine valve gear, actuating cam means movable about an axis and having differently arranged profiles at different points along said axis, a movable member through which a valve of the engine is adapted to be moved, a motion transmitting element interposed between the cam means and said member and adapted to operate the latter from the former, means mounting said element for adjustable movement axially along said cam means, and an idler lever elongated axially of the cam means and interposed between said member and said element, whereby the valve actuating motion is transmitted regardless of the longitudinal position of said element.

3. A valve gear according to claim 2, wherein the end of said element which contacts with said idler lever is curved to provide substantially a rolling contact therebetween under the action of the cam means.

4. A valve gear according to claim 2, incorporating means for swinging said idler lever out of the range of operating movement of said element, for "drifting" operation of the engine.

5. In steam-engine valve gear provided with a cam case, a rotating non-sliding cam located in said case, a plurality of profiles provided on said cam progressively lengthwise thereof, swiveling operating levers receiving the movement of said cam, means for transmitting the displacement of said levers to distribution valves for operating the same, slidable supporting means located in the cam case and carrying said swiveling operating levers, and means for causing said supporting means to slide in the cam case along said cam in order to bring said operating levers into association with different parts or profiles of said cam whereby to vary the actuation of said valves according to the position of said supporting means in said case, the means for causing said supporting means or carrier to slide in the cam case embodying a rack on said supporting means and a pinion in engagement with said rack.

6. In steam-engine valve gear provided with a cam case, a rotating non-sliding cam located in said case, a plurality of profiles provided on said cam progressively lengthwise thereof, swiveling operating levers receiving the movement of said cam, means for transmitting the displacement of said levers to distribution valves for operating the same, slidable supporting means located in the cam case and carrying said swiveling operating levers, and means for causing said supporting means to slide in the cam case along said cam in order to bring said operating levers into association with different parts or profiles of said cam whereby to vary the actuation of said valves according to the position of said supporting means in said case, said cam case having a removable end-plate, and said supporting means or carrier with the various parts mounted thereon being slidable endwise out of the case.

7. In steam-engine valve gear, actuating cam means movable about an axis and having differently arranged profiles at different points along said axis, a plurality of movable members through which admission and exhaust valves of the engine are adapted to be moved, motion transmitting elements interposed between the cam means and said members and adapted to operate the latter from the former, and means mounting said elements for adjustable movement axially along said cam means, comprising independent slidable supports or carriers for independent control of the admission and exhaust valves.

8. A valve gear according to claim 7, incorporating an intermediate bearing for the cam shaft between a pair of said carriers.

9. A valve gear according to claim 7, wherein adjacent independent carriers have concentric cylindrical bearings.

10. A valve gear according to claim 7, wherein adjacent independent carriers have telescoping bearings.

11. A valve gear according to claim 7, wherein adjacent independent carriers have bearings serving also as an intermediate support for the camshaft.

12. A valve gear according to claim 7, having common control means for said carriers effecting a differential movement thereof.

13. In steam engine valve gear, separate admission and exhaust actuating cam means movable about an axis and having differently arranged profiles at different points along said axis, separate movable members through which admission and exhaust valves of the engine are adapted to be moved, separate motion transmitting elements interposed between the cam means and said members and adapted to operate the latter from the former, separate mounting means or carriers for said elements for effecting adjustable movement thereof axially along said cam means, and means for effecting adjustments between the admission and exhaust carriers whereby to adjust the admission and exhaust events.

14. In steam engine valve gear, actuating cam means movable about an axis and having differently arranged profiles at different points along said axis, separate movable members through which valves at opposite ends of a cylinder of the engine are adapted to be moved, motion transmitting elements located at opposite sides of the cam means and interposed respectively between the cam means and said separate members and adapted to operate the latter from the former, and common carrier means mounting said separate elements for adjustable movement in unison axially along said cam means.

15. In steam engine valve gear, actuating cam means movable about an axis and having differently arranged profiles at different points along said axis, separate movable members through which valves at opposite ends of a cylinder of the engine are adapted to be moved, motion transmitting elements located at opposite sides of the cam means and interposed respectively between the cam means and said separate members and adapted to operate the latter from the former, and carrier means substantially surrounding said cam means peripherally and mounting said elements for adjustable movement axially along the cam means.

PIERRE LAVARDE.
AIMÉ EVRARD.